United States Patent
Sun et al.

(10) Patent No.: US 10,537,857 B2
(45) Date of Patent: Jan. 21, 2020

(54) METHOD OF PREPARING A NANOCOMPOSITE MEMBRANE AND NANOCOMPOSITE MEMBRANES PREPARED THEREOF

(75) Inventors: Darren Delai Sun, Singapore (SG); Zhaoyang Liu, Singapore (SG)

(73) Assignee: NANYANG TECHNOLOGICAL UNIVERSITY, Singapore (SG)

( * ) Notice: Subject to any disclaimer, the term of this patent is extended or adjusted under 35 U.S.C. 154(b) by 0 days.

(21) Appl. No.: 13/642,110

(22) PCT Filed: Apr. 25, 2011

(86) PCT No.: PCT/SG2011/000161
§ 371 (c)(1),
(2), (4) Date: Dec. 26, 2012

(87) PCT Pub. No.: WO2011/133116
PCT Pub. Date: Oct. 27, 2011

(65) Prior Publication Data
US 2013/0098833 A1    Apr. 25, 2013

Related U.S. Application Data

(60) Provisional application No. 61/326,896, filed on Apr. 22, 2010.

(51) Int. Cl.
*B01D 69/12*    (2006.01)

(52) U.S. Cl.
CPC .................. *B01D 69/122* (2013.01)

(58) Field of Classification Search
CPC ............. B01D 61/002; B01D 67/0009; B01D 67/0011; B01D 67/002; B01D 67/0079; B01D 69/087; B01D 69/10; B01D 69/122; B01D 69/141; B01D 69/148; B01D 2323/08; B01D 2323/40; B01D 2325/023; B01D 2325/24; B01D 2325/28; B01D 2325/40; B01D 71/16; B01D 71/56;
(Continued)

(56) References Cited

U.S. PATENT DOCUMENTS

| 3,724,672 A | 4/1973 | Leonard et al. |
| 6,391,205 B1 | 5/2002 | McGinnis |

(Continued)

FOREIGN PATENT DOCUMENTS

WO    WO 2007042281 A2 *   4/2007   ............... C08L 5/08

OTHER PUBLICATIONS

Xi, et al., "Nafion/SiO2 hybrid membrane for vanadium redox flow battery," J. of Power Sources, Vo. 166, Issue 2 (2007), pp. 531-536.*

*Primary Examiner* — Patrick Orme
(74) *Attorney, Agent, or Firm* — Seed Intellectual Property Law Group LLP

(57) ABSTRACT

The present invention relates to a method of preparing a nanocomposite membrane, comprising: (a) providing a nanocomposite solution comprising a polymer solution and nanomaterials; (b) subjecting the nanocomposite solution to a cold water bath to produce the nanocomposite membrane in a gel-like form; and (c) subjecting the gel nanocomposite membrane to a heat treatment to solidify the nanocomposite membrane, wherein the nanomaterials are dispersed within the polymer matrix of the nanocomposite membrane.

14 Claims, 7 Drawing Sheets

(58) Field of Classification Search
CPC . B01D 71/74; C02F 1/44; C02F 1/445; C02F 1/444; C02F 2103/08; C01G 23/047; C01P 2004/13
USPC .............. 210/500.21, 500.25, 500.27, 500.3, 210/500.38, 653; 264/177.11, 184, 442; 427/243, 258; 977/773
See application file for complete search history.

(56) References Cited

U.S. PATENT DOCUMENTS

| | | |
|---|---|---|
| 6,929,884 B2 | 8/2005 | Cheiky et al. |
| 7,445,712 B2 | 11/2008 | Herron |
| 7,560,029 B2 | 7/2009 | McGinnis |
| 7,566,402 B2 | 7/2009 | Thoresen et al. |
| 2006/0226067 A1* | 10/2006 | Herron .......................... 210/490 |
| 2010/0206811 A1* | 8/2010 | Ng et al. ....................... 210/654 |
| 2010/0224555 A1* | 9/2010 | Hoek et al. .............. 210/500.42 |
| 2010/0233812 A1 | 9/2010 | Sun et al. |
| 2011/0024355 A1 | 2/2011 | Mansouri et al. |
| 2011/0027599 A1 | 2/2011 | Hoek et al. |
| 2011/0073540 A1* | 3/2011 | McGinnis et al. ............ 210/490 |
| 2012/0000846 A1* | 1/2012 | Herron .................... 210/500.29 |
| 2013/0284664 A1* | 10/2013 | Takagi et al. ................. 210/488 |
| 2013/0327701 A1* | 12/2013 | Han et al. ..................... 210/490 |

\* cited by examiner

METHOD OF PREPARING A NANOCOMPOSITE MEMBRANE AND NANOCOMPOSITE MEMBRANES PREPARED THEREOF

CROSS-REFERENCE TO RELATED APPLICATION

This application claims the benefit of priority of U.S. Provisional Application No. 61/326,896, filed 22 Apr. 2010, the contents of which being hereby incorporated by reference it its entirety for all purposes.

TECHNICAL FIELD

The invention relates to a method of preparing a nanocomposite semipermeable membrane for forward osmosis applications in wastewater treatment, seawater desalination, food and pharmaceutical processing, and power generation.

BACKGROUND

Forward osmosis (FO) process makes use of the natural osmosis phenomenon for the transport of water from a low solute concentration feed solution to a high solute concentration draw solution across a semipermeable membrane, with the osmotic pressure difference between the feed and the draw solution acting as the driving force. After the water naturally permeates into the draw solution without external energy input, the diluted draw solution can then be recycled for reuse in the FO process while high quality water product can be produced.

The FO process has recently shown great potential for wastewater reuse and seawater desalination. It has various advantages over current membrane technology, especially the reverse osmosis (RO) process. These advantages include a lower energy consumption needed for the osmosis process and a lower fouling potential of the membrane. One of the most important challenges in utilizing the FO process for practical applications is the lack of such suitable membrane. Water permeate flux obtained with current FO membrane is usually lower than expected. The low permeate flux attributes to the severe internal concentration polarization (ICP) effect occurring in the porous support layer of the membrane.

Due to the limitations posed by the severe ICP effect on water permeate flux for current forward osmosis membranes, new forward osmosis membranes with superior water permeate flux and high solute rejection rate are desired.

SUMMARY

Various embodiments provide for methods of preparing nanocomposite semipermeable membranes that contain dispersed nanomaterials within the polymer matrix for forward osmosis applications such as wastewater treatment, seawater desalination, food and pharmaceutical processing, power generation, and the like. With the addition of nanomaterials dispersed within the polymer matrix of the porous support layer of the membranes, significant increase of water permeate flux is achieved, while high solute rejection rate is maintained, compared to membranes having no added nanomaterials.

Various embodiments provide for a method of preparing a nanocomposite membrane. The method may include:

(a) providing a nanocomposite solution comprising a polymer solution and nanomaterials;
(b) subjecting the nanocomposite solution to a cold water bath to produce the nanocomposite membrane in a gel-like form; and
(c) subjecting the gel nanocomposite membrane to a heat treatment to solidify the nanocomposite membrane, wherein the nanomaterials are dispersed within the polymer matrix of the nanocomposite membrane.

Various embodiments provide for a nanocomposite membrane which may include:

a dense selective layer, wherein the dense selective layer is permeable to water but is impermeable to solutes; and
a porous support layer, wherein the porous support layer comprises nanomaterials dispersed within a polymer matrix.

BRIEF DESCRIPTION OF THE DRAWINGS

In the drawings, like reference characters generally refer to the same parts throughout the different views. The drawings are not necessarily drawn to scale, emphasis instead generally being placed upon illustrating the principles of various embodiments. In the following description, various embodiments of the invention are described with reference to the following drawings.

DESCRIPTION

Figure 1:
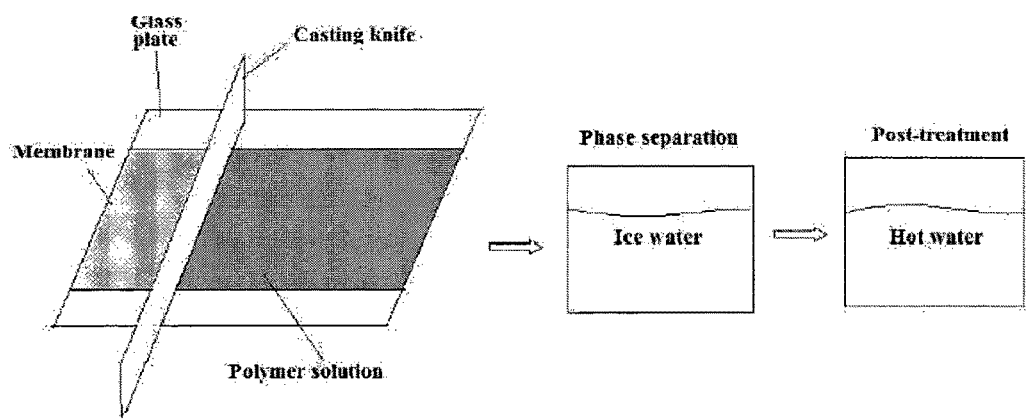
FIG. 1 shows a schematic diagram of the casting process for preparing a flat sheet membrane.

The following detailed description refers to the accompanying drawings that show, by way of illustration, specific details and embodiments in which the invention may be practised. These embodiments are described in sufficient detail to enable those skilled in the art to practise the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

Osmosis is defined as the net movement of water across a selectively permeable membrane driven by a difference in osmotic pressure across the membrane. A selectively permeable membrane (or semipermeable membrane) allows passage of water molecules, but rejects solute molecules or ions. The semipermeable membrane filters the impurities from a water source (feed solution) which is suspected to contain impurities, leaving purified water on the other side (permeate side) of the membrane called permeate water. The impurities left on the membrane may be washed away by a portion of the feed solution that does not pass through the membrane. The feed solution carrying the impurities washed away from the membrane is also called "reject" or "brine".

Various embodiments of the invention make use of a forward osmosis (FO) membrane developed as an alternative membrane technology for wastewater treatment due to the low energy requirement as a result of low or no hydraulic pressure applied, high rejection of a wide range of contaminants, and low membrane fouling propensity compared to pressure-driven membrane processes, such as reverse osmosis (RO). FO process uses the osmotic pressure differential across the membrane, rather than hydraulic pressure differential (as in RO processes) as the driving force for transport of water through the membrane. The FO process results in concentration of the feed solution and dilution of a highly concentrated stream (referred to as the draw solution). In other words, the FO process utilizes the natural osmosis phenomenon, which makes use of concentration differences between the two solutions across a semipermeable membrane. The semipermeable membrane acts as a selective barrier between the two solutions, and dominates the efficiency of freshwater transportation in the FO process. A concentrated draw solution on the permeate side of the membrane is the source of the driving force in the FO process. Different terms are used in the literature to name this solution including draw solution, osmotic agent, or osmotic media to name only a few. In a FO process the draw solution has a higher osmotic pressure than the feed solution (or reject or brine).

Various embodiments provide for a method of preparing a nanocomposite membrane. The method may be a phase inversion type for preparing asymmetric nanocomposite membranes. The membranes may be polymer-based. Further, the membranes may have a dense selective layer disposed adjacent a porous support layer whereby the dense selectively layer is used for rejecting solutes in the wastewaste stream, for example, and the porous support layer is used for providing mechanical strength to the membrane.

The method may include providing a nanocomposite solution comprising a polymer solution and nanomaterials. The polymer solution is first prepared in a suitable solvent or system of solvents. Suitable solvent or system of solvents include solvents that are miscible with the polymer so that a homogeneous solution may be formed thereafter. In one embodiment, the system of solvents may include N-methyl-2-pyrrolidone, Dimethylformamide, acetone and water (see Examples below).

In various embodiments, the polymer of the polymer solution is a natural polymer. Examples of the natural polymer include cellulose-based polymers such as cellulose acetate, cellulose triacetate, cellulose acetate proprianate, cellulose butyrate, cellulose acetate propionate, cellulose diacetate, cellulose dibutyrate, cellulose tributyrate, hydroxypropyl cellulose, and nitrocellulose. In one embodiment, the polymer in the polymer solution is cellulose acetate.

In various embodiments, the polymer of the polymer solution is a synthetic polymer. Examples of the synthetic polymer include polyamide, polybenzimidazole, polyethersulfone, polysulfone, polyvinyl alcohol, polyvinyl pyrrole, polyvinyl pyrrolidone, polyethylene glycol, saponified polyethylene-vinyl acetate copolymer, triethylene glycol, and diethylene glycol.

In various embodiments, the nanomaterials may be nanoparticles, nanofibers, nanowires, nanotubes, or nanospheres. In one embodiment, the nanomaterials are nanotubes. In another embodiment, the nanomaterials are nanoparticles.

In various embodiments, the nanomaterials are inorganic materials. Examples of suitable inorganic materials include titanium, silicon, aluminium, zirconium, indium, tin, magnesium, calcium, including the respective oxide thereof and alloy thereof. In one embodiment, the nanomaterials may be titanium oxide nanotubes or nanoparticles. In another embodiment, the nanomaterials may be tetraethyl orthosilicate.

In various embodiments, the nanomaterials may be mesoporous materials. Examples of suitable mesoporous materials include aluminosilicate, aluminophopsphate, and zeolite.

In various embodiments, the nanomaterials may be organic materials. Examples of suitable organic materials include dendrimers, graphite, graphene, carbon nanotube, and fullerene.

In various embodiments, the nanomaterials are present in the polymer matrix in the range of about 0.1 wt % to about 20 wt % (based on total weight of the polymer matrix).

In various embodiments, the nanomaterials are in the size from about 1 nm to about 1,000 nm.

The method may further include homogenizing the nanocomposite solution. In various embodiments, the nanocomposite solution may be stirred continuously until a homogenized nanocomposite solution is obtained. The stirring may be carried out via a mechanical stirrer or magnetic stirrer, for example. In various embodiments, the stirring is continued for more than one day. In one embodiment, the stirring is continued for about two days.

In various embodiments, the obtained homogenized nanocomposite solution may be subjected to an ultrasound bath to remove air bubbles or partially evaporate volatile components of the solvent. The volatile components may be vaporized at room temperature.

The method may also include subjecting the homogenized nanocomposite solution to a cold water bath to produce the nanocomposite membrane in a gel-like form. The method may further include subjecting the gel nanocomposite membrane to a heat treatment to solidify the nanocomposite membrane, whereby the nanomaterials are dispersed within the polymer matrix of the nanocomposite membrane.

In various embodiments, after obtaining the homogenized nanocomposite solution and prior to subjecting the homogenized nanocomposite solution to a cold water bath, the homogenized nanocomposite solution may be cast on a plate to form a cast film. For example, FIG. 1 illustrates the general process used for preparing nanocomposite membranes by solution casting. Phase inversion is used for the preparation of flat sheet membranes. In the polymer solution casting, a polymer solution, comprising polymers and nanomaterials (0.1 to 20 wt %, based on total weight of the polymer matrix) in solvents, is stirred continuously until the solution become homogenous. The polymer solution is then casted on a glass plate using a casting knife. The cast film was then immersed into the cold water bath (or coagulation bath) to complete the phase inversion. The membranes were then post-treated in a hot water bath.

Figure 2:
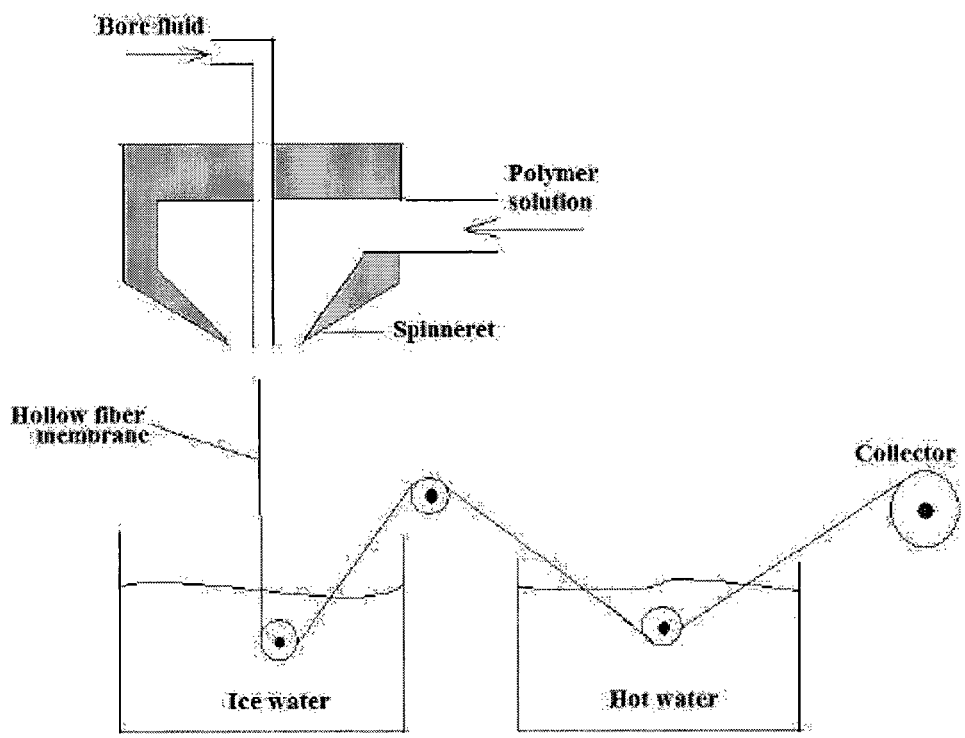
FIG. 2 shows a schematic diagram of the spinning process for preparing a hollow fiber membrane.

In alternative embodiments, after obtaining the homogenized nanocomposite solution and prior to subjecting the homogenized nanocomposite solution to a cold water bath, the homogenized nanocomposite solution may be extruded through a hollow fiber spinneret. For example, FIG. 2 illustrates the general process used for preparing nanocomposite membranes in the form of hollow fiber by dry-wet spinning. In the dry-wet spinning process, the polymer solution (same as that used for preparing the flat sheet membranes) flows through the ring nozzle of the spinneret while a bore fluid flowed through the inner tube of the spinneret. The fiber passes through a controlled environment air gap before entering the cold water bath (or coagulation bath). The hollow fiber filament then passes through a series of rollers in the coagulation bath. Following that, it is then passed through a washing bath. The fully formed hollow fiber is then continuously collected on a wind up drum. Prior to evaluation test, the membranes are subjected to a pretreatment process to reduce pore size of the membranes. In the pretreatment process, the membranes are immersed in a water bath at room temperature and the water bath with the membranes in it are gradually heated from ambient temperature to about 60 to 100° C. range in about 20 to 30 minutes. The final temperature is kept constant for about 10 minutes. The water bath together with the membranes are then cooled drastically to below 60° C. by pouring cold water directly into the bath to freeze the membrane structure. The membranes are then ready to undergo solvent exchange to prevent fibers from collapsing during evaluation tests.

In various embodiments, the nanocomposite membrane prepared thereof by the above-described method may be a porous support layer for providing mechanical strength to subsequent layers disposed thereon. In various embodiments, the nanocomposite membrane may include a porous support layer and a dense selective layer. The dense selective layer is disposed adjacent the porous support layer. The dense selective layer is permeable to water but is impermeable to solutes. The porous support layer comprises nanomaterials dispersed within a polymer matrix. The porous support layer may provide mechanical strength to the nanocomposite membrane. Both the porous support layer and the dense selective layer may be formed of the same polymer. Alternatively, the polymer of the porous support layer and the dense selective layer is different.

In various embodiments, the membrane may include a smooth layer disposed adjacent the dense selective layer and away from the porous support layer. The smooth layer may be used to prevent or minimize membrane fouling. The materials for the smooth layer can be polyvinyl acetate and polyvinylpyrrolidone.

In various embodiments, the membrane may also include an intermediate layer between the dense selective layer and the porous support layer. The intermediate layer may be a polymer which is the same as the dense selective layer, the same as the porous support layer, the same as both the dense selective layer and the porous support layer, or different from any of the layer. The materials for the intermediate layer can be cellulose, polysulfone, polyethersulfone and polyacrylonitrile.

In various embodiments where the membrane include a dense selective layer and a porous support layer, the dense selective layer may be formed and disposed on the porous support layer by a method selected from the group consisting of phase inversion, interfacial polymerization, spray coating, and dip coating. In various embodiments, the dense selective layer may be formed simultaneously with the porous support layer. In alternative embodiments, the dense selective layer is subsequently formed on the porous support layer.

In one embodiment, the nanocomposite membranes may be used in forward osmosis processes. For example, the nanocomposite membranes may be used in wastewater treatment, seawater desalination, food and pharmaceutical processing, or power generation via forward osmosis processes.

The water permeate flux of the nanocomposite membranes were found to be dependent on the amount of nanomaterials used. Compared with the forward osmosis membrane fabricated without nanomaterials, a breakthrough in the water permeate flux of the nanocomposite forward osmosis membranes was achieved, with almost unchanged solute rejection performance.

In order that the invention may be readily understood and put into practical effect, particular embodiments will now be described by way of the following non-limiting examples.

EXAMPLES

Forward Osmosis Tests of Nanocomposite Membranes

In the following Examples, membranes prepared according to the invention were tested in forward osmosis mode without hydraulic pressure. Each membrane was tested in a crossflow mode with 1M $Al_2(SO_4)_3$ as draw solution and DI water as feed solution. The feed solution was directed against the dense selective layer of the membranes and the draw solution was directed against the support layer. Both the feed and draw solutions were maintained at room temperature 25° C.

Results of the solute rejection rate by the nanocomposite membranes of the following Examples are shown in Table 1 below.

TABLE 1

Solute Rejection Rate of Nanocomposite Forward Osmosis Membranes

| | Flat sheet | Hollow fiber |
|---|---|---|
| $Al_2(SO_4)_3$ | 99% | 99% |
| NaCl | 96% | 96% |

Determination of Water Permeate Flux and Solute Rejection

In the following Examples, water permeate flux is determined by measuring the weight change of the draw solution over a selected time period. As water transports across the membrane from the feed water into the draw solution, the weight of draw solution was increased. The solute concentration is determined by Inductively Coupled Plasma Emission Spectrometer (ICP).

Example 1

Figure 3:
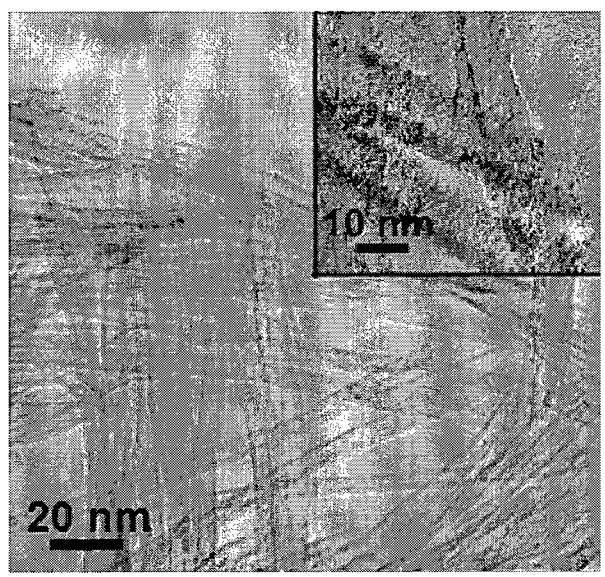
FIG. 3 shows the TEM of $TiO_2$ nanotubes prepared in the Examples.
Figure 4:
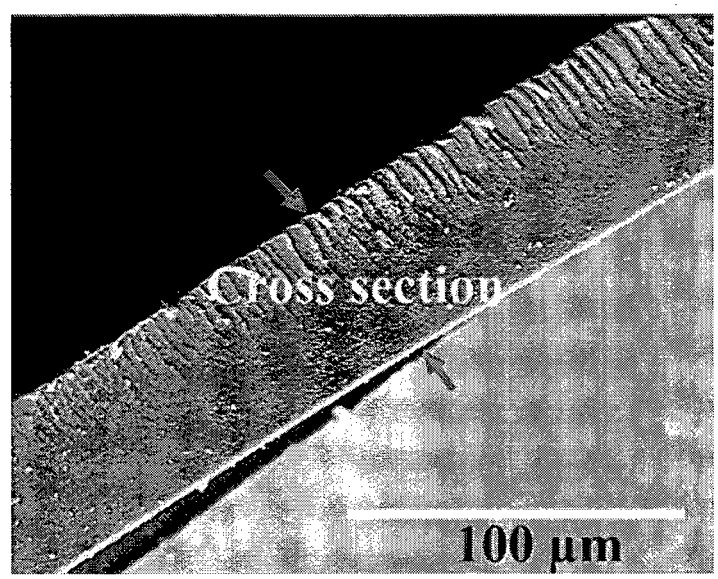
FIG. 4 shows the cross-sectional view of a flat sheet nanocomposite forward osmosis membrane.
Figure 5:
FIG. 5 shows the cross-sectional view of a hollow fiber nanocomposite forward osmosis membrane.

Flat Sheet Nanocomposite Membranes with $TiO_2$ Nanotubes Dispersed in Cellulose Matrix $TiO_2$ nanotubes were fabricated as follows: Commercial $TiO_2$ (P25, degussa) powders were mixed with a 10M NaOH aqueous solution by magnetic stirring, then the mixture was added into a Teflon-lined stainless steel autoclave. The autoclave was heated to 160° C. from room temperature in 2 h, then maintained at 160° C. for 48 h and finally cooled to room temperature. The obtained precipitates were firstly washed with distilled water, then adjusted the pH to neutral with 0.1M HCl solution, and finally were washed repeatedly with distilled water and ethanol until no Cl⁻ was examined in the solution. After ultrasound treatment for 10 min, the $TiO_2$ nanotubes were obtained. The transmission electron microscopy (TEM) of $TiO_2$ nanotubes is shown in FIG. 3.

Conventional phase inversion was used for the preparation of flat sheet nanocomposite forward osmosis membranes. A solution comprising cellulose acetate (MW 30,000 g/mol, 39.8 wt % acethyl content) 22.0 wt %, acetone 66.7 wt %, water 10.0 wt %, magnesium perchlorate 1.0 wt % and $TiO_2$ nanotubes (FIG. 3) 0.3 wt % was stirred continuously for two days. The solution was homogenized and put into an ultrasound bath for 30 min to remove air bubbles before casting. Then the casting solution was casted on a glass plate using a casting knife. The cast film was then immersed in an ice water bath to complete the phase separation. The membranes were heat-treated at 80° C. in a hot water bath for 10 min. Then the membranes were immersed in a 50 wt % glycerol water solution for another 24 h and then were dried in air at room temperature for evaluation tests.

Figure 6:
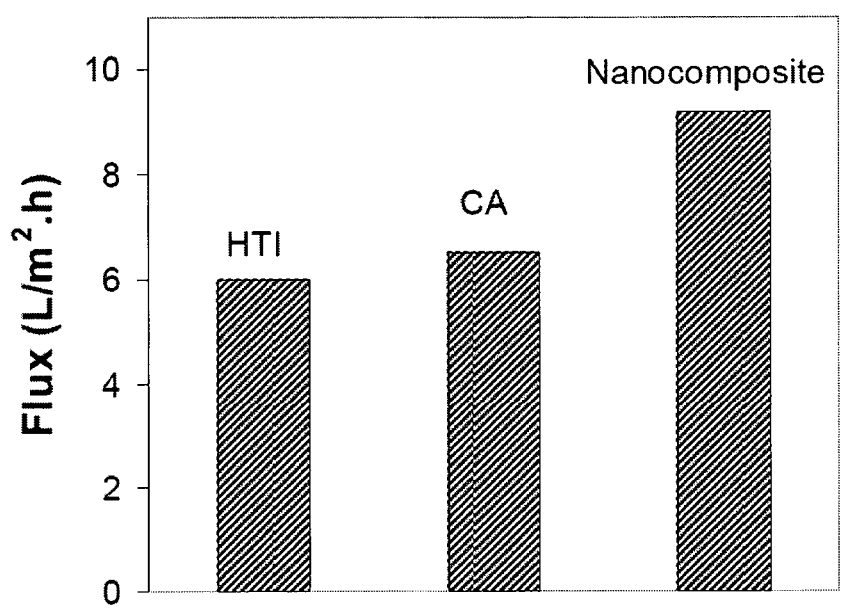
FIG. 6 shows the water permeate flux comparisons of different flat sheet forward osmosis membranes. HTI™ denotes a commercial forward osmosis membrane from Hydration Technologies Inc.; CA denotes a cellulose acetate forward osmosis membrane prepared without nanomaterials; Nanocomposite-Cellulose acetate denotes a nanocomposite forward osmosis membrane prepared with TiO2 nanotubes.
Figure 7:
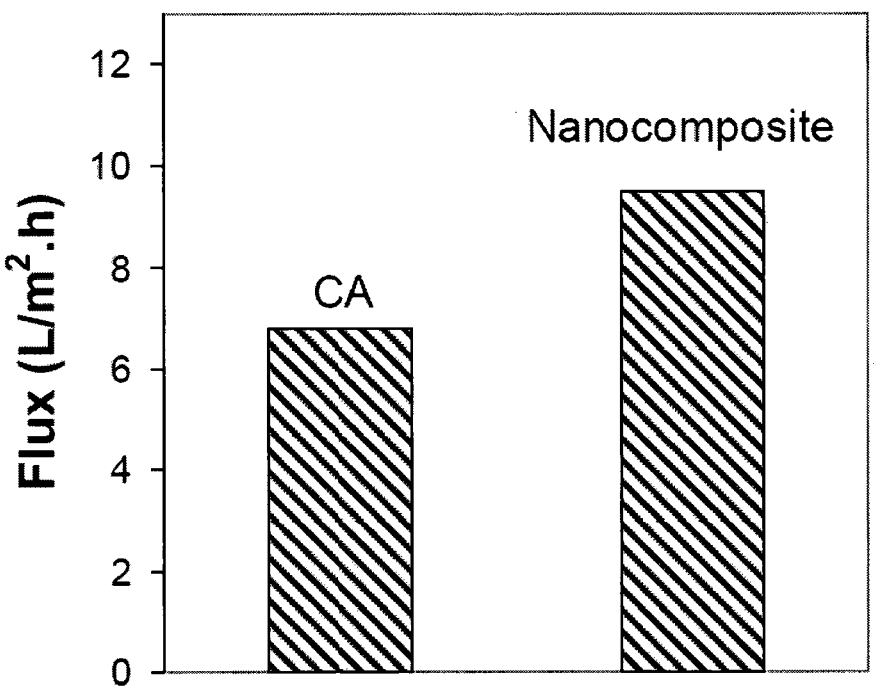
FIG. 7 shows the water permeate flux comparisons of different hollow fiber forward osmosis membranes.

Under the same forward osmosis experimental conditions, the nanocomposite membrane had a notably higher water flux than commercially available HTI™ membrane (FIG. 6).

Example 2

Flat-Sheet Nanocomposite Membranes with $TiO_2$ Nanoparticles Dispersed in Cellulose Matrix Conventional phase inversion was used for the preparation of flat-sheet nanocomposite forward osmosis membranes. A solution comprising cellulose acetate (MW 30,000 g/mol, 39.8 wt % acethyl content) 22.0 wt %, acetone 66.7 wt %, water 10.0 wt %, magnesium perchlorate 1.1 wt % and TiO2 nanoparticles (Degussa P25) 0.2 wt % was stirred continuously for two days. The solution was homogenized and put into an ultrasound bath for 30 min to remove air bubbles before casting. Then the casting solution was casted on a glass plate using a casting knife. The cast film was then immersed in an ice water bath to complete the phase separation. The membranes were heat-treated at 80° C. in a hot water bath for 10 min. Then the membranes were immersed in a 50 wt % glycerol solution for another 24 h and then were dried in air at room temperature for evaluation tests.

Example 3

Flat-Sheet Nanocomposite Membranes with Silica Nanoparticles Dispersed in Cellulose Matrix Conventional phase inversion was used for the preparation of flat-sheet nanocomposite membranes. An acetate solution comprising cellulose acetate (MW 30,000 g/mol, 39.8 wt % acethyl content) 22.0 wt %, acetone 66.0 wt %, water 10.0 parts, magnesium perchlorate 1.1 wt % and Tetraethyl orthosilicate 0.9 wt % was stirred continuously for two days. The solution was homogenized and put into an ultrasound bath for 30 min to remove air bubbles before casting. Then the casting solution was casted on a glass plate using a casting knife. The cast film was then immersed in an ice water bath to complete the phase separation. The membranes were heat-treated at 80° C. in a hot water bath for 10 min. Then the membranes were immersed in a 50 wt % glycerol solution for another 24 h and then were dried in air at room temperature for evaluation tests.

Example 4

Nanocomposite Membranes in the Form of Hollow Fiber

Spinning of the hollow-fiber membrane was based on the dry-wet technique. A homogenous spinning solution was prepared same as that for the flat-sheet membrane. Afterward, the dope was extruded through a hollow fiber spinneret. Both the core liquid and the external coagulant were pure water, and the external coagulant temperature was controlled at 80° C. The air gap which is the distance between the tip of spinneret and the surface of external coagulant was kept 20 cm. After coagulation in iced water, the resulting hollow fiber was wound up with a take-up roller and rinsed with water to remove residual solvents. Then the fibers were annealed in a hot water bath at 80° C. Finally, the fibers were immersed in a 50 wt % glycerol solution for another 24 h and then were dried in air at room temperature for evaluation tests.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A method, comprising:
   preparing a forward osmosis nanocomposite membrane comprising a selective layer and a porous support layer, the preparing including:
   (a) providing a nanocomposite solution comprising a polymer solution and nanomaterials;
   (b) subjecting the nanocomposite solution to a water bath, wherein subjecting the nanocomposite solution to the water bath produces a gel nanocomposite membrane; and
   (c) subjecting the gel nanocomposite membrane to a heat treatment to form the porous support layer, wherein subjecting the gel nanocomposite membrane to the heat treatment solidifies the gel nanocomposite membrane and forms the porous support layer, wherein the forward osmosis nanocomposite membrane is configured to operate based on an osmotic pressure differential thereacross such that water is filtered through the forward osmosis nanocomposite membrane into a draw solution at a permeate side of the forward osmosis nanocomposite membrane from a feed solution at another side of the forward osmosis nanocomposite membrane opposing the permeate side, the draw solution having a higher solute concentration than the feed solution, wherein the nanomaterials are dispersed within the polymer matrix of the forward osmosis nanocomposite membrane, and wherein the nanomaterials are selected from the group consisting of titanium dioxide, tetraethylorthosilicate, aluminosilicate, and zeolite.

2. The method of claim 1, wherein the nanomaterials are present in the polymer matrix in the range of about 0.1 wt % to about 20 wt % (based on total weight of the polymer matrix).

3. The method of claim 1, wherein the polymer of the polymer solution is a natural polymer selected from the group consisting of cellulose acetate, cellulose triacetate, cellulose acetate proprianate, cellulose butyrate, cellulose acetate propionate, cellulose diacetate, cellulose dibutyrate, cellulose tributyrate, hydroxypropyl cellulose, and nitrocellulose.

4. The method of claim 1, wherein the polymer of the polymer solution is a synthetic polymer selected from the group consisting of polyamide, polybenzimidazole, polyethersulfone, polysulfone, polyvinyl alcohol, polyvinyl pyrrole, polyvinyl pyrrolidone, polyethylene glycol, saponified polyethylene-vinyl acetate copolymer, triethylene glycol, and diethylene glycol.

5. The method of claim 1, wherein prior to (b), the nanocomposite solution is cast on a plate to form a cast film.

6. The method of claim 1, wherein prior to (b), the nanocomposite solution is extruded through a hollow fiber spinneret.

7. The method of claim 1, further comprising homogenizing the nanocomposite solution prior to (b).

8. The method of claim 7, further comprising subjecting the homogenized nanocomposite solution to an ultrasound bath to remove air bubbles prior to (c).

9. The method of claim 1, wherein the water bath comprises an ice water bath.

10. The method of claim 1, wherein the heat treatment comprises a hot water bath from about 60 C to about 100 C.

11. A forward osmosis nanocomposite membrane prepared by the method of claim 1, comprising a porous support layer formed of:

a matrix of the polymer comprised in the polymer solution; and nanomaterials dispersed within the polymer matrix, wherein the forward osmosis nanocomposite membrane is configured to operate based on an osmotic pressure differential thereacross such that water is filtered through the forward osmosis nanocomposite membrane into a draw solution at a permeate side of the forward osmosis nanocomposite membrane from a feed solution at another side of the forward osmosis nanocomposite membrane opposing the permeate side, the draw solution having a higher solute concentration than the feed solution.

12. The forward osmosis nanocomposite membrane of claim 11, wherein the selective layer is disposed adjacent the porous support layer, and the selective layer is made of a polymer.

13. The forward osmosis nanocomposite membrane of claim 12, further comprising a first layer disposed adjacent the selective layer and away from the porous support layer.

14. The forward osmosis nanocomposite membrane of claim 12, further comprising an intermediate layer between the selective layer and the porous support layer, wherein the intermediate layer is made of a polymer.

* * * * *